April 20, 1965

R. B. WARD 3,179,905

ROTARY SWITCH FOR SELECTIVELY CONNECTING PLURAL SQUARE
WAVEGUIDES HAVING DUAL POLARIZATION WITH
A COMMON SQUARE WAVEGUIDE
Filed Jan. 3, 1962

INVENTOR.
ROBERT B. WARD
BY

ATTORNEY

United States Patent Office 3,179,905
Patented Apr. 20, 1965

3,179,905
ROTARY SWITCH FOR SELECTIVELY CONNECTING PLURAL SQUARE WAVEGUIDES HAVING DUAL POLARIZATION WITH A COMMON SQUARE WAVEGUIDE
Robert B. Ward, Los Altos, Calif., assignor to Sperry Rand Corporation, Great Neck, N.Y., a corporation of Delaware
Filed Jan. 3, 1962, Ser. No. 163,981
12 Claims. (Cl. 333—7)

This invention relates to a waveguide switch and more particularly to a multi-terminal switch for sequentially coupling orthogonally polarized energy between one terminal and each of the remaining terminals.

The waveguide switch of this invention is intended for use in an aircraft continuous wave (C.W.) Doppler radar navigation system of the type which has become known as a Janus type system wherein three or four beams of microwave energy are directed toward the ground both in the forward and backward directions with respect to the position of the aircraft. A C.W. radar system often utilizes separate antenna systems for transmitting and receiving to obtain isolation between the transmitter and receiver, but because space and weight are prime considerations in aircraft equipment, separate antenna systems and the additional microwave equipment associated therewith are to be avoided if at all possible. In a Doppler radar navigation system it is desired that the system be insensitive to echo signals reflected from rain drops in order that the radar system will not indicate the velocity of the aircraft with respect to the rain rather than the ground. The dual polarization switch of the present invention provides means for permitting the radar system to discriminate against echo signals from rain and allows a single antenna system to be utilized for both transmission and reception by sequentially energizing four hours which in turn sequentially irradiate a common reflector and lens which direct the C.W. energy toward the ground in four different directions. The energy propagating through the switch from the transmitter to the horns is linearly polarized in a first direction and the received energy propagating through the switch from the horns to the receiver is linearly polarized in an orthogonal direction. This dual polarization operation is possible because most objects illuminated by the radiated energy are irregularly shaped and produce a strong cross-polarized component in the reflected energy. It is this cross-polarized component which is detected and utilized in the receiver. This dual-polarization operation of the system also provides rain discrimination against the reflected echo signals because rain drops are very nearly spherical in shape and will induce only a very small cross-polarized component in the echo signal.

The waveguide switch of the present invention is comprised of five physical square waveguide terminals, one adapted to be coupled to a dual polarization duplexer, and the remaining four being radially disposed in a common plane at 90° with respect to each other and each adapted to be coupled to a radiating horn for producing the four beams of microwave energy. The waveguide switch operates to sequentially connect the duplexer to each of the four hours and is capable of propagating transmitted and received C.W. energy of orthogonal polarizations. The requirements of the waveguide switch for use in the described system are that it must be small and lightweight, must provide rapid switching action, must provide high isolation between the switch terminals and high isolation between the orthogonally polarized transmit and receive energy and must be an efficient propagator of the orthogonally polarized energy.

It is therefore the primary object of this invention to provide the above-described features in a waveguide switch.

It is another object of this invention to provide a dual polarization high-speed waveguide switch which eliminates the need for rotating joints in waveguide transmission lines.

Another object of the invention is to provide a dual polarization waveguide switch which is relatively easy and economical to construct.

These and other objects and advantages of this invention will be described by referring to the accompanying drawings wherein.

Figure 1:
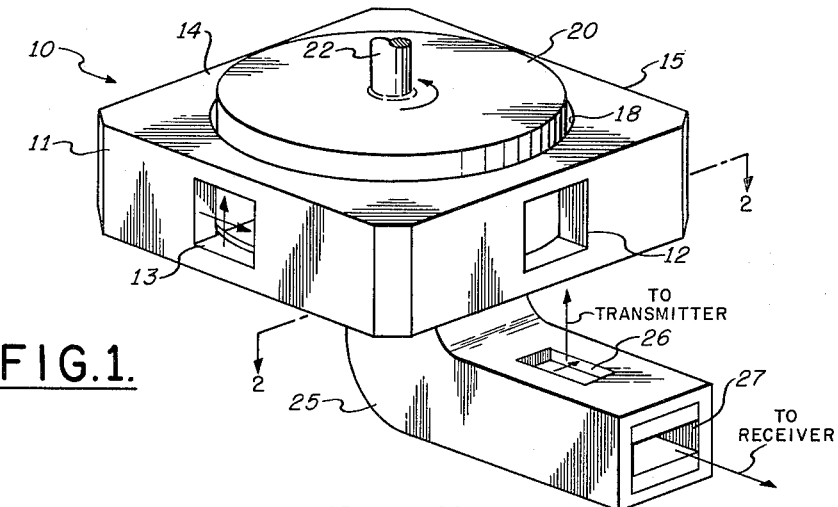
FIG. 1 is a perspective view of the waveguide switch and accompanying dual polarization duplexer of this invention.
Figure 2:
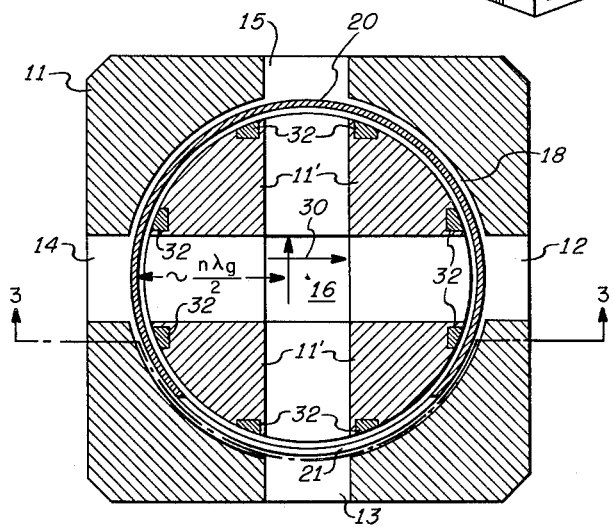
FIG. 2 is a sectional view of the switch of FIG. 1 taken along the section 2—2 of FIG. 1.
Figure 3:
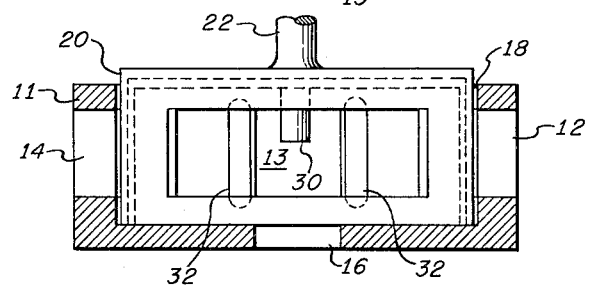
FIG. 3 is a sectional view of the switch of this invention taken along the section 3—3 of FIG. 2.

Referring now in more detail to the drawings, the perspective view of the switch in FIG. 1 shows that the switch is comprised of an outer body member 11 having square waveguide terminals 12, 13, 14 and 15 disposed at 90° with respect to each other and each extending radially inwardly through an inner body member 11', FIG. 2, to join in a common junction. A fifth square waveguide terminal 16 is located on the bottom surface of inner body member 11' and extends inwardly to join with the common junction of terminals 12–15, thereby forming a symmetrical junction of the five square waveguides. A narrow circular slot 18 separates outer and inner body members 11 and 11' and receives a circular cylindrical shutter member 20 which extends within slot 18 to a position below the bottom surfaces of the square waveguides connecting terminals 12–15. Shutter member 20 is rotatable about its central axis by actuating means (not shown) which may be coupled to stem 22. As seen in FIGS. 2 and 3, shutter member 20 has a single aperture 21 on its cylindrical surface whose angular opening extends through approximately 90° and whose height is greater than the height of the terminals 12–16. In the position of shutter 20 illustrated in FIGS. 2 and 3, aperture 21 is in registration with waveguide terminal 13 to permit the free passage of microwave energy therethrough. Said cylindrical shutter 20, however, acts as an effective short circuit to completely block the waveguides of terminals 12, 14 and 15. Shutter 20 provides substantially complete short circuits in each of three waveguides at a distance approximately equal to an integral number of half waveguide wavelengths from the common junction. As shutter 20 is rotated about its central axis, in a clockwise direction for example, it successively opens the waveguides of terminals 12, 15 and 14, and at each open position acts as a short circuit to the three unopened waveguides. As seen in FIG. 3, a matching post 30 is symmetrically disposed within the common junction along the axis of symmetry thereof to provide impedance matching means for the junction.

As seen in FIG. 1, a dual polarization duplexer 25 is coupled to square waveguide terminal 16. Duplexer 25 is comprised of a section of square waveguide having a first rectangular waveguide terminal 26 on the top wall thereof for coupling only microwave energy linearly polarized in a first linear polarization, and has a second waveguide terminal 27 at its right end for coupling only linearly polarized waves of a second polarization that is orthogonal to the polarization of waves introduced at terminal 26. Terminals 26 and 27 of duplexer 25 may be coupled to a transmitter and a receiver, respectively.

Each of the square waveguides of terminals 12–16 and the end of duplexer 25 coupled to terminal 16 are dimensioned to freely propagate orthogonally polarized waves in both the linear $TE_{10}$ and $TE_{01}$ modes.

The common junction formed by the square waveguides of terminals 12–16 is physically and electrically symmetrical and, considering the two orthogonal polarizations of the energy, the device is in reality a ten port network. When apertured shutter 20 is in any of its registering positions with a square waveguide of one of the terminals 12–15, six of the ports are shorted out by shutter 20 and the four remaining ports of the junction are in communication with each other. A detailed analysis of the ten port network of the switch of FIG. 1 shows that with six of the ports shorted at equal distances from the common junction it is impossible for all combinations of four communicating ports to be perfectly matched. However, the matching post 30, FIG. 3, inserted along the axis of symmetry of the junction very nearly matches the junction and substantially complete transfer of the orthogonally polarized energy between communicating ports may be achieved. The dimensions of post 30 are best determined empirically.

In the operation of the switch of this invention, apertured shutter 20 will be rotated about its cylindrical axis by suitable means coupled to stem 22. Energy from a transmitter is coupled through terminal 26 on the top wall of duplexer 25 and propagates to the left therein in a horizontally polarized $TE_{01}$ mode. Assuming that aperture 21 in cylinder 20 is in registration with the waveguide of terminal 13 at this instant, the horizontally polarized energy from the transmitter will enter bottom terminal 16, will enter the common junction in inner body member 11′, will be reflected from the shorted waveguide of terminals 12, 14 and 15 and will be substantially completely propagated from terminal 13 as vertically polarized waves. This energy then is directed by suitable horn, reflecting and lens means into a focused beam which extends in the downward direction from the aircraft. Irregularly shaped objects on the ground will reflect the radiated energy back toward the aircraft with a component part of that energy being transformed to a polarization that is orthogonal to that the radiated energy, i.e., horizontal polarization. This horizontally polarized energy then enters terminal 13, is coupled to the common junction, is reflected from the shorted waveguides of terminals 12, 14 and 15, and is substantially completely coupled through square terminal 16 to terminal 27 of duplexer 25. Terminal 27 will accept only energy that is vertically polarized at the terminal and will completely reflect horizontally polarized energy. Suitable matching and tuning structures may be provided in duplexer 25 for matching the orthogonally polarized terminals 26 and 27 to square waveguide terminal 16. As apertured shutter 20 is rotated about its cylindrical axis it will successively come into registration with waveguide terminals 12, 15 and 14, and during each registration thereof the above described operation will be repeated to produce a different beam which radiates and receives reflected energy from a different portion of the ground.

To assure good isolation between the transmitter and receiver, the short circuits in the shorted waveguides must be substantially the same distance from the junction and must be substantially unchanging. Therefore, close mechanical tolerance is required between the cylindrical slot 18 and apertured shutter 20. Suitable lubricants may be used between the walls of cylindrical slot 18 and shutter 20 to provide relatively free rotation of cylinder 20 within slot 18. To further assure good isolation within the switch, inserts 32 of a material dissipative to microwave energy are inserted within slots cut in inner housing member 11′ adjacent the corners where slot 18 communicates with the respective waveguide terminals 12–15. This dissipative material attenuates the leakage currents which would tend to flow between adjacent waveguides.

Aperture shutter 20 may be continuously rotated during operation of the switch, or it may be intermittently rotated by means of a stepping switch or by means of a Geneva drive mechanism. Other suitable means for rotating shutter 20 may be provided if desired.

The switch of the invention has been successfully operated in the Ke-band of microwave frequencies over a frequency bandwidth of 20 megacycles per second, and propagated approximately 98% of the incident transmitter energy with a voltage standing wave ratio of approximately 1.3. The isolation between the transmitter and receiver was at least 40 db.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:
1. A dual polarization waveguide switch comprised of four square waveguides lying in a common plane and joined at one of their ends in a common junction, said waveguides being symmetrically disposed about the central axis of said junction, a fifth square waveguide directly connected to said four waveguides at said junction along said central axis,
   each of said square waveguides being dimensioned to freely propagate orthogonal linearly polarized microwave energy at a given frequency,
   and rotatable apertured shutter means intersecting each of the four waveguides for short circuiting three of said waveguides and for permitting the free passage of linearly polarized waves of orthogonal polarizations between the fourth and fifth waveguides when the aperture of said shutter means is in registration with the fourth waveguide.
2. The combination claimed in claim 1 including impedance matching means positioned along the axis of symmetry of said junction for matching the fifth waveguide to the fourth waveguide.
3. The combination claimed in claim 1 including means for rotating said shutter means to successively bring the aperture thereof into registration with each one of said four waveguides.
4. The combination claimed in claim 1 wherein said apertured shutter means is a cylinder of conductive material rotatable about the symmetrical axis of said common junction, the cylindrical surface of said cylinder being disposed within slots provided in each of said four waveguides.
5. A dual polarization waveguide switch comprising outer and inner body members,
   a plurality of more than two square waveguide terminals symmetrically disposed about the lateral surfaces of the outer body member and each terminating a respective square waveguide extending radially inwardly through said two body members to join in a common square waveguide junction at the center of said inner body member,
   an additional square waveguide directly connected to said junction and extending along the symmetrical axis thereof perpendicular to said plurality of square waveguides,
   said outer and inner body members being radially separated by a narrow cylindrical slot which traverses each of said plurality of square waveguides,
   a cylindrical shutter member of conductive material rotatably disposed within said slot,
   a single aperture in the cylindrical surface of said shutter member,
       said aperture having dimensions at least as great as the dimensions of one of said square waveguide terminals and axially positioned for registration with said radially extending waveguides, whereby the rotation of said shutter member provides successive communication between said additional square waveguide and each one of said plurality of square waveguide terminals.

6. A dual polarization waveguide switch comprised of a cylindrical body member,
a plurality of more than two square waveguides extending radially inwardly from the cylindrical surface of said body member and joining in a common junction,
an additional square waveguide extending inwardly from an end surface of said cylindrical member and joining said plurality of square waveguides at said common junction,
    all of said square waveguides being dimensioned to propogate linearly polarized waves of orthogonal polarizations,
a rotatable cylindrical shutter member of electrically conductive material disposed about the cylindrical surface of said body member,
and a single aperture in the cylindrical surface of said shutter member,
    said aperture having dimensions at least as great as the dimensions of said square waveguides and being axially positioned for reigstration with said plurality of square waveguides,
    whereby said additional square waveguide successively communicates with each of said plurality of square waveguides as said shutter member rotates.

7. The combination claimed in claim 6 wherein said junction is physically and electrically substantially symmetrical about the central axis of said additional waveguide and wherein said combination further includes impedance matching means in said junction.

8. The combination claimed in claim 6 and further including dual polarization duplexing means coupled to said additional waveguide for coupling into and out of said additional waveguide linearly polarized waves of orthogonal polarizations.

9. A dual polarization antenna system for sequentially producing differently-directed beams of electromagnetic waves comprising,
a body member having a plurality of more than two square waveguide terminals disposed about its periphery in a symmetrical manner with respect to a central axis through said body member,
a plurality of more than two square waveguide sections each extending inwardly from a respective terminal and all joining in a common square waveguide junction at said central axis,
an additional square waveguide terminal centrally positioned on a surface of said body member transverse to said axis,
an additional square waveguide extending inwardly from said additional terminal along said axis to join said plurality of square waveguides in said common junction,
a rotatable apertured shutter means intersecting each of said plurality of waveguides for short-circuiting all but one of said plurality of waveguides for permitting the free passage of linearly polarized waves of orthogonal polarizations between said additional waveguide terminal and said one waveguide terminal when the aperture of said shutter means is in regstration with said one waveguide,
a dual polarization duplexing means coupled to said additional waveguide terminal,
    said duplexing means comprising a section of square waveguide adapted to propagate linearly polarized electromagnetic waves of orthogonal polarizations,
and first and second polarization selective coupling means coupled to said last-named square waveguide for coupling linearly polarized waves of a first polarization from said first coupling means to said last-named square waveguide and for coupling linearly polarized waves of an orthogonal polarization from said last-named square waveguide to said second coupling means.

10. A dual polarization waveguide switching system comprising,
a body member having four square waveguide terminals disposed about its periphery in a symmetrical manner with respect to a central axis through said body member,
four square waveguide sections each extending inwardly from a respective terminal and all joining in a common square waveguide junction at said central axis,
an additional square waveguide terminal,
an additional square waveguide extending along said axis from said additional terminal to join said four square waveguides in said common junction,
    all of said waveguides being dimensioned to propagate only orthogonally polarized waves in the $TE_{10}$ and $TE_{01}$ modes,
a rotatable, apertured, cylindrical conductive member intersecting each of said four waveguides for short-circuiting selected ones of said four waveguides and thereby permitting the free passage of linearly polarized waves of orthogonal polarizations between said additional square waveguide terminal and the remainder of said four waveguide terminals.

11. The combination claimed in claim 10 and further including,
a dual polarization duplexing means coupled to said additional square waveguide terminal,
said duplexing means comprising
a section of square waveguide adapted to propagate linearly polarized electromagnetic waves of orthogonal polarizations,
and first and second polarization selective coupling means coupled to said last-named square waveguide for coupling linear polarized waves of a first polarization from said first coupling means to said last-named square waveguide and for coupling linear polarized waves of an orthogonal polarization from said last-named square waveguide to said second coupling means.

12. A dual polarization waveguide switch comprising,
a switch body member,
a plurality of more than two square waveguides extending radially inwardly from the periphery of said body member and joining in the common square waveguide junction,
    said waveguides lying in common plane transverse to the central axis of said junction,
an additional square waveguide extending parallel to said axis and joining said plurality of square waveguides at said common junction,
    all of said square waveguides being dimensioned to propogate linear polarized waves of orthogonal polarizations,
a rotatable, apertured, conductive member intersecting each of said four waveguides for short-circuiting only selected ones of said four waveguides and thereby permitting the free passage of linear polarized waves of orthogonal polarizations between said additional square waveguide and the remainder of said plurality of square waveguides.

References Cited by the Examiner

UNITED STATES PATENTS

| | | | |
|---|---|---|---|
| 2,735,985 | 2/56 | Thomas | 333—8 |
| 2,761,059 | 8/56 | Purcell et al. | 333—11 |
| 2,814,782 | 11/57 | Zaleski | 333—7 |

FOREIGN PATENTS 718,865   11/54   Great Britain.

HERMAN KARL SAALBACH, *Primary Examiner.*